US012564918B2

(12) United States Patent
Neitzell

(10) Patent No.: US 12,564,918 B2
(45) Date of Patent: *Mar. 3, 2026

(54) TOOL BIT

(71) Applicant: MILWAUKEE ELECTRIC TOOL CORPORATION, Brookfield, WI (US)

(72) Inventor: Roger D. Neitzell, Palmyra, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 597 days.

This patent is subject to a terminal disclaimer.

(21) Appl. No.: 17/718,827

(22) Filed: Apr. 12, 2022

(65) Prior Publication Data

US 2022/0234177 A1 Jul. 28, 2022

Related U.S. Application Data

(63) Continuation of application No. 16/027,691, filed on Jul. 5, 2018, now abandoned, which is a continuation
(Continued)

(51) Int. Cl.
*B25B 15/00* (2006.01)
*B22F 3/22* (2006.01)
(Continued)

(52) U.S. Cl.
CPC ............ *B25B 15/002* (2013.01); *B22F 3/225* (2013.01); *B22F 7/06* (2013.01); *B25B 15/005* (2013.01);
(Continued)

(58) Field of Classification Search
CPC . B25B 15/002; B25B 15/005; B25B 23/0007; B25F 3/225; B25F 7/06; B25F 2005/001; B25F 2998/10
(Continued)

(56) References Cited

U.S. PATENT DOCUMENTS 442,710 A 12/1890 Marsh
876,675 A 1/1908 Albrecht
(Continued)

FOREIGN PATENT DOCUMENTS

CN 201070753 Y 6/2008
DE 2231949 A1 2/1973
(Continued)

OTHER PUBLICATIONS

Vessel, "Problem Solvers are ready to go!" catalog, 5 pages, printed from web site www.vessel.jp/online/pro_b_bit.html on Sep. 11, 2008.

(Continued)

*Primary Examiner* — Hadi Shakeri
(74) *Attorney, Agent, or Firm* — Michael Best & Friedrich LLP

(57) ABSTRACT

A tool bit includes a hexagonal drive portion, a working end, and a shank. The working end is made of a first material and a has a first hardness. The shank connects the drive portion to the working end. The shank defines a longitudinal axis about which the tool bit is rotatable. The shank is made of a second material having a second, different hardness. The shank includes a protrusion and an annular shoulder. The shank extends within a portion of the working end and has a distal end. The annual shoulder surrounds the protrusion. At least one of the distal end or the shoulder is oriented perpendicular to the longitudinal axis.

19 Claims, 5 Drawing Sheets

Related U.S. Application Data of application No. 14/596,739, filed on Jan. 14, 2015, now Pat. No. 10,022,845.

(60) Provisional application No. 61/928,266, filed on Jan. 16, 2014.

(51) Int. Cl.
*B22F 5/00* (2006.01)
*B22F 7/06* (2006.01)
*B25B 23/00* (2006.01)

(52) U.S. Cl.
CPC .... *B25B 23/0007* (2013.01); *B22F 2005/001* (2013.01); *B22F 2998/10* (2013.01)

(58) Field of Classification Search
USPC .................................................. 81/438, 460
See application file for complete search history.

(56) References Cited

U.S. PATENT DOCUMENTS 896,443 A 8/1908 Dyett
925,115 A 6/1909 Loewenberg
D59,417 S 10/1921 Graham
1,645,672 A 10/1927 Van Saun
1,776,525 A 9/1930 Talbot
1,923,132 A 8/1933 Witkin
1,932,113 A 10/1933 Long
1,979,460 A 11/1934 Forsberg
1,984,839 A 12/1934 Murray
2,010,616 A 8/1935 Walsh
2,022,703 A 12/1935 Banner
2,216,382 A 10/1940 West et al.
2,281,631 A 5/1942 Spillman
2,307,556 A 1/1943 Wileman
2,366,682 A 1/1945 West et al.
2,400,684 A 5/1946 Clark
2,410,971 A 11/1946 Hartley
2,417,225 A 3/1947 West et al.
2,445,978 A 7/1948 Stellin
D150,800 S 8/1948 Magnus, Jr.
2,515,839 A 7/1950 Robertson
2,522,996 A 9/1950 Cone
2,523,041 A 9/1950 McKenzie
2,537,029 A 1/1951 Cambern
2,592,978 A 4/1952 Trimboli
2,621,688 A 12/1952 Wales
2,804,894 A 9/1957 Rosenburg
2,820,382 A 1/1958 Smith
2,833,548 A 5/1958 Clark
2,964,931 A 12/1960 Sorenson
2,969,660 A 1/1961 Dale et al.
3,129,571 A 4/1964 Reynolds
3,151,512 A 10/1964 Charczenko
3,213,719 A 10/1965 Kloack
3,237,741 A 3/1966 Potter et al.
3,253,626 A 5/1966 Stillwagon, Jr. et al.
3,331,267 A 7/1967 Tietge
3,387,669 A 6/1968 Wise, Jr. et al.
3,392,793 A 7/1968 Pauley
3,393,722 A 7/1968 Windham
3,419,135 A 12/1968 Millner
D218,609 S 9/1970 Charles
3,592,087 A 7/1971 Pauley
3,703,916 A 11/1972 Sundsten et al.
3,753,625 A 8/1973 Fabrizo et al.
3,888,144 A 6/1975 Parsons
3,891,017 A 6/1975 Iskra
3,916,736 A 11/1975 Clemens
3,969,810 A 7/1976 Pagano
3,985,170 A 10/1976 Iskra
4,037,515 A 7/1977 Kesselman
4,092,753 A 6/1978 Fuhrmann
4,096,896 A 6/1978 Engel
4,105,056 A 8/1978 Arnn
4,197,118 A 4/1980 Weich, Jr.
4,215,600 A 8/1980 Kesselman
4,246,811 A 1/1981 Bondhus et al.
4,399,723 A 8/1983 Marleau
4,409,867 A 10/1983 Lyden
4,573,839 A 3/1986 Finnegan
4,680,996 A 7/1987 Gold
4,692,073 A 9/1987 Martindell
4,705,124 A 11/1987 Abrahamson et al.
4,710,223 A 12/1987 Matejczyk
4,737,332 A 4/1988 Miyashita et al.
4,765,950 A 8/1988 Johnson
4,782,574 A 11/1988 Karcher et al.
4,795,598 A 1/1989 Billiet
4,800,786 A 1/1989 Arnold et al.
4,825,732 A 5/1989 Arnold et al.
4,833,951 A 5/1989 Karcher et al.
4,836,059 A 6/1989 Arnold
4,838,361 A 6/1989 O'Toole
4,852,196 A 8/1989 Martin
4,884,478 A 12/1989 Lieser
4,936,170 A 6/1990 Zumeta
4,943,403 A 7/1990 Miyashita et al.
4,947,713 A 8/1990 Arnold
4,964,907 A 10/1990 Kiyota et al.
4,982,627 A 1/1991 Johnson
5,009,841 A 4/1991 Bloemacher et al.
5,012,708 A 5/1991 Martindell
5,012,709 A 5/1991 Su et al.
5,028,367 A 7/1991 Wei et al.
5,031,488 A 7/1991 Zumeta
5,059,387 A 10/1991 Brasel
5,070,750 A 12/1991 Jones et al.
5,079,978 A 1/1992 Kupfer
5,122,326 A 6/1992 Jackson et al.
5,140,877 A 8/1992 Sloan
5,152,642 A 10/1992 Pitts et al.
5,176,050 A 1/1993 Sauer et al.
5,180,042 A 1/1993 Ogiso
5,182,973 A 2/1993 Martindell
5,199,336 A 4/1993 Wuilmart
5,228,250 A 7/1993 Kesselman
5,262,122 A 11/1993 Weich, Jr.
5,295,423 A 3/1994 Mikic
5,295,831 A 3/1994 Patterson et al.
5,299,474 A 4/1994 Hohmann et al.
5,330,230 A 7/1994 Craig
5,332,537 A 7/1994 Hens et al.
RE34,680 E 8/1994 Lieser
5,338,508 A 8/1994 Nitta et al.
D350,685 S 9/1994 Perkins et al.
5,353,667 A 10/1994 Wilner
5,370,021 A 12/1994 Shigematsu
5,380,476 A 1/1995 Matsushita et al.
5,397,531 A 3/1995 Peiris et al.
D359,335 S 6/1995 Cartwright
5,535,867 A 7/1996 Coccaro et al.
5,613,183 A 3/1997 Weich, Jr.
5,619,882 A 4/1997 Godtner
5,627,258 A 5/1997 Takayama et al.
5,641,920 A 6/1997 Hens et al.
5,676,421 A 10/1997 Brodsky
5,704,261 A 1/1998 Strauch et al.
5,791,212 A 8/1998 Han
5,819,606 A 10/1998 Arnold
5,830,287 A 11/1998 Pinnow et al.
5,868,047 A 2/1999 Faust et al.
5,885,149 A 3/1999 Gillet et al.
D410,372 S 6/1999 Strauch
5,950,063 A 9/1999 Hens et al.
5,953,969 A 9/1999 Rosenhan
5,957,012 A 9/1999 McCune
5,984,596 A 11/1999 Fehrle et al.
6,019,022 A 2/2000 Dotson
6,032,556 A 3/2000 Hu
6,047,618 A 4/2000 Pieri
6,051,184 A 4/2000 Kankawa
6,082,227 A 7/2000 Vogel

(56) References Cited

U.S. PATENT DOCUMENTS

| | | | |
|---|---|---|---|
| 6,089,133 | A | 7/2000 | Liao |
| 6,093,761 | A | 7/2000 | Schofalvi |
| RE36,797 | E | 8/2000 | Eggert et al. |
| 6,098,499 | A | 8/2000 | Pool |
| D431,768 | S | 10/2000 | Feik |
| 6,138,539 | A | 10/2000 | Carchidi et al. |
| 6,193,242 | B1 | 2/2001 | Robison |
| 6,204,316 | B1 | 3/2001 | Schofalvi |
| 6,234,660 | B1 | 5/2001 | Hullmann et al. |
| D445,325 | S | 7/2001 | Fruhm |
| 6,257,098 | B1 | 7/2001 | Cirone |
| 6,302,001 | B1 | 10/2001 | Karle |
| 6,308,598 | B1 | 10/2001 | O'Neil |
| 6,332,384 | B1 | 12/2001 | Cluthe |
| 6,345,560 | B1 | 2/2002 | Strauch et al. |
| 6,352,011 | B1 | 3/2002 | Fruhm |
| D455,627 | S | 4/2002 | Song |
| D455,943 | S | 4/2002 | Lin |
| 6,376,585 | B1 | 4/2002 | Schofalvi et al. |
| 6,393,950 | B1 | 5/2002 | Crosser |
| 6,435,065 | B2 | 8/2002 | Kozak et al. |
| D462,596 | S | 9/2002 | Fruhm |
| 6,490,950 | B2 | 12/2002 | Ray et al. |
| 6,520,055 | B1 | 2/2003 | Reusch et al. |
| 6,537,487 | B1 | 3/2003 | Kuhns |
| 6,547,210 | B1 | 4/2003 | Marx et al. |
| 6,547,562 | B2 | 4/2003 | Kumar |
| 6,666,258 | B1 | 12/2003 | Kono |
| 6,701,814 | B2 | 3/2004 | Porkapile |
| 6,733,896 | B2 | 5/2004 | Dolan et al. |
| 6,761,093 | B2 | 7/2004 | Chang |
| 6,792,831 | B2 | 9/2004 | Crosser |
| 6,883,405 | B2 | 4/2005 | Strauch |
| 6,988,859 | B2 | 1/2006 | Borschert et al. |
| 7,010,998 | B2 | 3/2006 | Ying-Hao |
| 7,028,588 | B2 | 4/2006 | Shih |
| 7,107,882 | B1 | 9/2006 | Chang |
| 7,117,765 | B1 | 10/2006 | Wallden |
| 7,143,670 | B2 | 12/2006 | Geary |
| 7,159,493 | B1 | 1/2007 | Huang |
| 7,168,348 | B2 | 1/2007 | Holland-Letz |
| 7,188,556 | B1 | 3/2007 | Rinner |
| 7,261,023 | B2 | 8/2007 | Taguchi |
| 7,331,263 | B2 | 2/2008 | Erickson et al. |
| 7,437,979 | B1 | 10/2008 | Wang |
| D596,003 | S | 7/2009 | Collier |
| D600,525 | S | 9/2009 | Meng |
| 7,581,470 | B1 | 9/2009 | Huang |
| 7,662,338 | B2 | 2/2010 | Tanaka |
| 7,814,815 | B2 | 10/2010 | Chen |
| D631,723 | S | 2/2011 | DeBaker |
| 7,882,908 | B2 | 2/2011 | Koch et al. |
| 7,959,706 | B2 | 6/2011 | Tanaka |
| D646,138 | S | 10/2011 | Hsu |
| D646,139 | S | 10/2011 | Hsu |
| D646,547 | S | 10/2011 | DeBaker |
| 8,028,608 | B2 | 10/2011 | Sixto, Jr. et al. |
| 8,047,260 | B2 | 11/2011 | Uno et al. |
| 8,052,156 | B2 | 11/2011 | Chen |
| 8,418,587 | B2 | 4/2013 | DeBaker |
| 8,468,913 | B1 | 6/2013 | Bond |
| 8,752,455 | B1 | 6/2014 | Taylor, Jr. |
| 8,955,418 | B2 | 2/2015 | Peters et al. |
| 8,973,474 | B2 | 3/2015 | Lai |
| D725,984 | S | 4/2015 | Moss et al. |
| D726,521 | S | 4/2015 | Moss et al. |
| D752,408 | S | 3/2016 | Moss et al. |
| 9,849,570 | B2 | 12/2017 | DeBaker |
| 10,022,845 | B2 | 7/2018 | Neitzell |
| 10,065,294 | B2 | 9/2018 | DeBaker |
| 2001/0001892 | A1 | 5/2001 | Hu |
| 2002/0046629 | A1 | 4/2002 | Borschert et al. |
| 2002/0060206 | A1 | 5/2002 | Katayama et al. |
| 2004/0007095 | A1 | 1/2004 | Meng |
| 2004/0099106 | A1 | 5/2004 | Strauch et al. |
| 2005/0028651 | A1 | 2/2005 | Crosser |
| 2005/0076749 | A1 | 4/2005 | Liu |
| 2005/0087045 | A1 | 4/2005 | Gryciuk et al. |
| 2005/0227772 | A1 | 10/2005 | Kletecka et al. |
| 2006/0027054 | A1 | 2/2006 | Wang |
| 2006/0130621 | A1 | 6/2006 | Novak et al. |
| 2006/0230887 | A1 | 10/2006 | Taguchi |
| 2006/0266163 | A1 | 11/2006 | Crosser |
| 2006/0286506 | A1 | 12/2006 | Birnholtz |
| 2007/0028728 | A1 | 2/2007 | Griffiths |
| 2007/0062382 | A1 | 3/2007 | Hu |
| 2007/0131065 | A1 | 6/2007 | Shih |
| 2007/0207715 | A1 | 9/2007 | Webb |
| 2007/0227314 | A1 | 10/2007 | Erickson et al. |
| 2008/0034928 | A1 | 2/2008 | Sheu |
| 2008/0047401 | A1 | 2/2008 | Lu |
| 2008/0087142 | A1 | 4/2008 | Lin |
| 2008/0216616 | A1 | 9/2008 | Hsieh |
| 2008/0295650 | A1 | 12/2008 | Hsieh |
| 2010/0139099 | A1 | 6/2010 | Blaauw |
| 2010/0154587 | A1 | 6/2010 | Eason |
| 2010/0192736 | A1* | 8/2010 | Burch .................. B25B 15/007 81/436 |
| 2010/0269264 | A1 | 10/2010 | Huang |
| 2010/0275741 | A1 | 11/2010 | Lai |
| 2010/0288086 | A1 | 11/2010 | Huang |
| 2010/0307298 | A1 | 12/2010 | Lai |
| 2011/0189046 | A1 | 8/2011 | Bruhn et al. |
| 2011/0197721 | A1 | 8/2011 | DeBaker |
| 2011/0266068 | A1 | 11/2011 | Eason et al. |
| 2011/0283842 | A1 | 11/2011 | Lai |
| 2011/0315456 | A1 | 12/2011 | Lyons |
| 2012/0003056 | A1 | 1/2012 | Jaeger |
| 2013/0129435 | A1 | 5/2013 | Ortlund et al. |
| 2013/0145903 | A1 | 6/2013 | DeBaker |
| 2014/0318328 | A1 | 10/2014 | DeBaker |
| 2015/0196995 | A1 | 7/2015 | Neitzell |
| 2018/0311799 | A1 | 11/2018 | Hsu |
| 2018/0326563 | A1 | 11/2018 | DeBaker |
| 2020/0055166 | A1 | 2/2020 | Van Essen et al. |
| 2020/0406433 | A1 | 12/2020 | Van Essen et al. |

FOREIGN PATENT DOCUMENTS

| | | | |
|---|---|---|---|
| DE | 3907567 | A1 | 9/1989 |
| DE | 4207964 | A1 | 9/1993 |
| DE | 19614961 | A1 | 2/1997 |
| DE | 19622846 | A1 | 12/1997 |
| DE | 19628901 | C1 | 1/1998 |
| DE | 10123407 | A1 | 1/2002 |
| DE | 10144990 | A1 | 2/2003 |
| EP | 0046209 | B1 | 9/1986 |
| EP | 0221279 | A2 | 5/1987 |
| EP | 0279899 | A1 | 8/1988 |
| EP | 0467232 | A2 | 1/1992 |
| EP | 0610693 | A1 | 8/1994 |
| GB | 963097 | A | 7/1964 |
| GB | 1476441 | A | 6/1977 |
| JP | 2000006037 | A | 1/2000 |
| JP | 2000167775 | A | 6/2000 |
| JP | 2000167776 | A | 6/2000 |
| JP | 2000198081 | A | 7/2000 |
| JP | 3285823 | B2 | 5/2002 |
| JP | 2003183761 | A | 7/2003 |
| JP | 2004142005 | A | 5/2004 |
| JP | 2004202665 | A | 7/2004 |
| JP | 2004237420 | A | 8/2004 |
| JP | 2005254406 | A | 9/2005 |
| JP | 2005254407 | A | 9/2005 |
| JP | 2006051563 | A | 2/2006 |
| JP | 2007111790 | A | 5/2007 |
| JP | 2008093799 | A | 4/2008 |
| JP | 2014223711 | A | 12/2014 |
| WO | 8908536 | A1 | 9/1989 |
| WO | 9004498 | A1 | 5/1990 |
| WO | 9414576 | A1 | 7/1994 |
| WO | 9415755 | A1 | 7/1994 |
| WO | 9630167 | A1 | 10/1996 |
| WO | 9912145 | A1 | 3/1999 |

(56) References Cited

FOREIGN PATENT DOCUMENTS

| | | | |
|---|---|---|---|
| WO | 2006094940 | A1 | 9/2006 |
| WO | 2006100283 | A1 | 9/2006 |
| WO | 2009029993 | A1 | 3/2009 |

OTHER PUBLICATIONS

Robert Bosch Power Tool Corporation, catalog, 1982, 3 pages.
Black & Decker, Catalog 1(K), Sep. 26, 1960, 4 pages.
Black & Decker, catalog, 1947, 4 pages.
PCT/US2009/063515 International Search Report and Written Opinion dated Dec. 23, 2009 (10 pages).
Wera Tools, Bit Checks Bit and holder sets in a extremely compact format, <http://www-us.wera.de/product_detail_us.html?L=1&file=root_category_tools_for_power_use_bit_sets_bit-checks_8700-9_ph_btz&lang-en-US> webpage accessed Jan. 12, 2015, 2 pages.
International Search Report and Written Opinion for Application No. PCT/US2018/063677 dated Mar. 22, 2019 (13 pages).

* cited by examiner

TOOL BIT

CROSS-REFERENCES TO RELATED APPLICATIONS

This application is a continuation of U.S. patent application Ser. No. 16/027,691 filed on Jul. 5, 2018, now abandoned, which is a continuation of U.S. patent application Ser. No. 14/596,739 filed on Jan. 14, 2015, now U.S. Pat. No. 10,022,845, which claims priority to U.S. Provisional Patent Application No. 61/928,266 filed on Jan. 16, 2014, the entire contents of all of which are incorporated herein by reference.

FIELD OF THE INVENTION

The present invention relates to tool bits, and more particularly to tool bits configured for interchangeable use with a driver.

BACKGROUND OF THE INVENTION

Tool bits, or insert bits, are often used with drivers configured to interchangeably receive the bits. For example, typical insert bits each include a hexagonal drive portion, a head or tip configured to engage a fastener, and a cylindrical shank connecting the drive portion and the tip. Drivers include a socket having a hexagonal recess in which the hexagonal drive portion of an insert bit is received and a stem or shank extending from the socket, which can be coupled to a handle for hand-use by an operator, or a power tool (e.g., a drill) for powered use by the operator. An interference fit between the hexagonal drive portion of the insert bit and the socket may be used to axially secure the insert bit to the driver, or quick-release structure may be employed to axially secure the insert bit to the driver.

SUMMARY OF THE INVENTION

The invention provides, in one aspect, a tool bit including a hexagonal drive portion, a working end, and a shank. The working end is made of a first material having a first hardness. The shank connects the drive portion to the working end. The shank defines a longitudinal axis about which the tool bit is rotatable. The shank is made of a second material having a second, different hardness. The shank includes a protrusion and an annular shoulder. The shank extends within a portion of the working end and has a distal end. The annual shoulder surrounds the protrusion. At least one of the distal end or the shoulder is oriented perpendicular to the longitudinal axis.

The invention provides, in another aspect, a tool bit including a hexagonal drive portion, a working end, and a shank. The working end is made of a first material having first hardness. The shank connects the drive portion to the working end. The shank defines a longitudinal axis about which the tool bit is rotatable. The shank is made of a second material having a second, different hardness. The working end includes a blind bore in which a portion of the shank is receivable. The interior surface of the blind bore is perpendicular to the longitudinal axis.

The invention provides, in yet another aspect, a tool bit hexagonal drive portion, a working end, and a shank. The working end is made of a first material having a first hardness. The shank connects the drive portion to the working end. The shank defines a longitudinal axis about which the tool bit is rotatable. The shank is made of a second material having a second, different hardness. The shank includes a distal end oriented perpendicular to the longitudinal axis.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
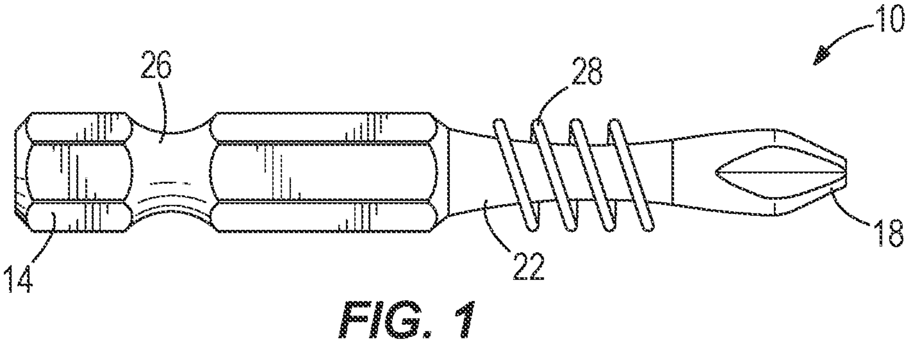
FIG. 1 is a perspective view of a tool bit in accordance with an embodiment of the invention.

FIG. 1 illustrates a tool bit 10 including a hexagonal drive portion 14, a working end, head, or tip 18 configured to engage a fastener, and a shank 22 interconnecting the drive portion 14 and the tip 18. The hexagonal drive portion 14 is intended to be engaged by any of a number of different tools, adapters, or components to receive torque from the tool, adapter, or component to rotate the bit 10. For example, the bit 10 may be utilized with a driver including a socket (not shown) having a corresponding hexagonal recess in which the hexagonal drive portion 14 of the bit 10 is received. The driver may also include a stem extending from the socket, which may be coupled to a handle for hand-use by an operator or to a chuck of a power tool (e.g., a drill) for powered use by the operator. A sliding, frictional fit between the hexagonal drive portion 14 of the bit 10 and the socket may be used to axially secure the bit 10 to the driver. Alternatively, a quick-release structure may be employed to axially secure the bit 10 to the driver. As shown in FIG. 1, the drive portion 14 of the bit 10 includes a groove 26 into which the quick-release structure (e.g., a ball detent) may be positioned to axially secure the bit 10 to the driver. Alternatively, the groove 26 may be omitted from the drive portion 14 of the bit 10 should a sliding frictional fit between the socket and the drive portion 14 be employed.

With continued reference to FIG. 1, the tip 18 of the bit 10 is configured as a Philips-style tip 18. Alternatively, the tip 18 may be differently configured to engage different style fasteners. For example, the tip 18 may be configured as a straight blade (otherwise known as a "regular head") to engage fasteners having a corresponding straight slot. Other tip configurations (e.g., hexagonal, star, square, etc.) may also be employed with the bit 10.

In the illustrated embodiment of FIG. 1, different manufacturing processes can be used to impart a greater hardness to the tip 18 compared to the hardness of the shank 22. For example, the entire bit 10 can be heat treated to an initial, relatively low hardness level and then a secondary heat treating process can be applied only to the tip 18 to increase the hardness of the tip 18 to a relatively high hardness level to reduce the wear imparted to the tip 18 during use of the bit 10. Alternatively, in a different manufacturing process, the entire bit 10 can be heat treated to an initial, relatively high hardness level and then a secondary annealing process (e.g., an induction annealing process using an induction coil 28) can be applied to the shank 22 (and, optionally, the drive portion 14) to reduce the hardness of the shank 22 (and optionally the drive portion 14) to a relatively low hardness level to increase the torsional resiliency of the shank 22, and therefore its impact resistance, during use of the bit 10.

In operation of the bit 10, the concavity of the shank 22 is configured to increase the impact resistance or the toughness of the bit 10, such that the drive portion 14 and the shank 22 of the bit 10 are allowed to elastically deform or twist relative to the tip 18 about a longitudinal axis of the bit 10. Specifically, the polar moment of inertia of the shank 22 is decreased by incorporating the concavity, thereby reducing the amount of torsion required to elastically twist the shank 22, compared to a shank having a cylindrical shape. The reduced hardness of the shank 22 relative to the tip 18 further increases the impact resistance of the bit 10, compared to a similar bit having a uniform hardness throughout.

Figure 2:
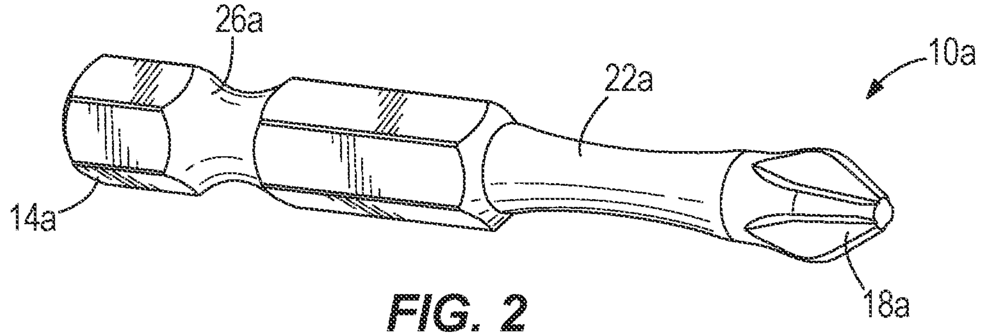
FIG. 2 is a perspective view of a tool bit in accordance with another embodiment of the invention.

FIG. 2 illustrates a tool bit 10*a* in accordance with another embodiment of the invention, with like reference numerals with the letter "a" assigned to like features as the tool bit 10 shown in FIG. 1. Rather than using multiple heat treating processes to impart the desired hardness profile to the bit 10*a*, the tip 18*a* of the bit 10*a* is made of a first material having a first hardness, and the shank 22*a* of the bit 10*a* is made of a second material having a second, different hardness. The first and second materials are chosen such that the first hardness is greater than the second hardness. Accordingly, the hardness of the tip 18*a* is greater than the hardness of the shank 22*a* to reduce the wear imparted to the tip 18*a* during use of the bit 10*a*. The reduced hardness of the shank 22*a* relative to the tip 18*a*, however, also increases the impact-resistance of the bit 10*a* as described above.

In the particular embodiment of the bit 10*a* shown in FIG. 2, an insert molding process, such as a two-shot metal injection molding ("MIM") process, is used to manufacture the bit 10*a* having the conjoined tip 18*a* and shank 22*a* made from two different metals. Particularly, the tip 18*a* is made of a metal having a greater hardness than that of the shank 22*a* and the drive portion 14*a*. Because the dissimilar metals of the tip 18*a* and the shank 22*a*, respectively, are conjoined or integrally formed during the two-shot MIM process, a secondary manufacturing process for connecting the tip 18*a* to the remainder of the bit 10*a* is unnecessary. The MIM process will be described in detail below. Alternatively, rather than using an insert molding process, the tip 18*a* may be attached to the shank 22*a* using a welding process (e.g., a spin-welding process).

Figure 3:
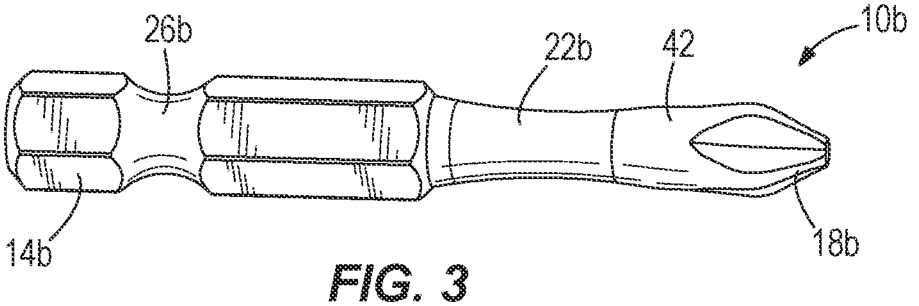
FIG. 3 is a perspective view of a tool bit in accordance with yet another embodiment of the invention.

FIG. 3 illustrates a tool bit 10*b* in accordance with yet another embodiment of the invention, with like reference numerals with the letter "b" assigned to like features as the tool bit 10 shown in FIG. 1. Rather than using different materials during the manufacturing process to create the tool bit 10*b*, the tip 18*b* includes a layer of cladding 42 having a hardness greater than the hardness of the shank 22*b*. Furthermore, the hardness of the cladding 42 is greater than the hardness of the underlying material from which the tip 18*b* is initially formed. The cladding 42 may be added to the tip 18*b* using any of a number of different processes (e.g., forging, welding, etc.). The addition of the cladding 42 to the tip 18*b* increases the wear resistance of the tip 18*b* in a similar manner as described above in connection with the bits 10, 10*a*.

Figure 4:
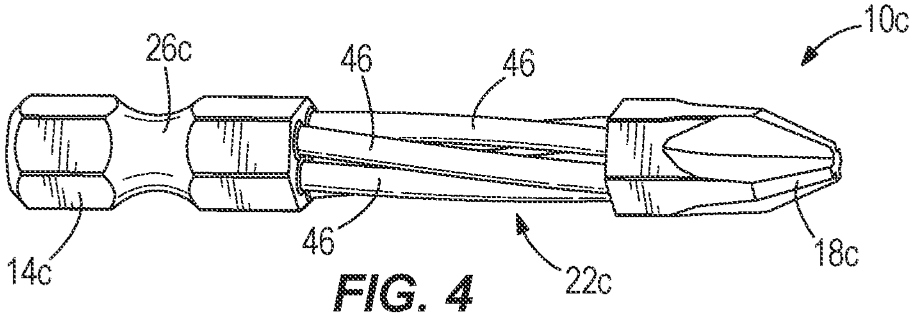
FIG. 4 is a perspective view of a tool bit in accordance with a further embodiment of the invention.

FIG. 4 illustrates a tool bit 10*c* in accordance with a further embodiment of the invention, with like reference numerals with the letter "c" assigned to like features as the tool bit 10 shown in FIG. 1. At least one of the hexagonal drive portion 14*c*, the tip 18*c*, and the shank 22*c* is made using a three-dimensional printing process. With such a process, different materials (e.g., metals) can be used for printing the tip 18*c* and the shank 22*c* to impart a greater hardness to the tip 18*c* relative to the shank 22*c* to reduce the wear imparted to the tip 18*c* during use of the bit 10*c*. For example, the tip 18*c* of the bit 10*c* may be printed from a first material having a first hardness, and the shank 22*c* of the bit 10*c* may be printed from a second material having a second, different hardness. The first and second materials are chosen such that the first hardness is greater than the second hardness. The tip 18*c* and the shank 22*c* may be conjoined or integrally formed during the printing process. Alternatively, separate printing processes using different materials may be used and a secondary manufacturing process (e.g., welding, etc.) may be used for joining the tip 18*c* and the shank 22*c*.

In the illustrated embodiment shown in FIG. 4, the shank 22*c* is comprised of several individual strands 46 interconnecting the tip 18*c* and the drive portion 14*c*. Each of the strands 46 is offset from a longitudinal axis of the bit 10*c* in a radially outward direction, thereby creating a void between the collection of individual strands 46. Such a configuration of the shank 22*c* decreases the polar moment of inertia of the shank 22*c*, thereby reducing the amount of torsion required to elastically twist the shank 22*c* compared to a shank having a solid, cylindrical shape. The reduced hardness of the shank 22*c* relative to the tip 18*c* further increases the impact resistance of the bit 10*c*, compared to a similar bit having a uniform hardness throughout.

Figure 5:
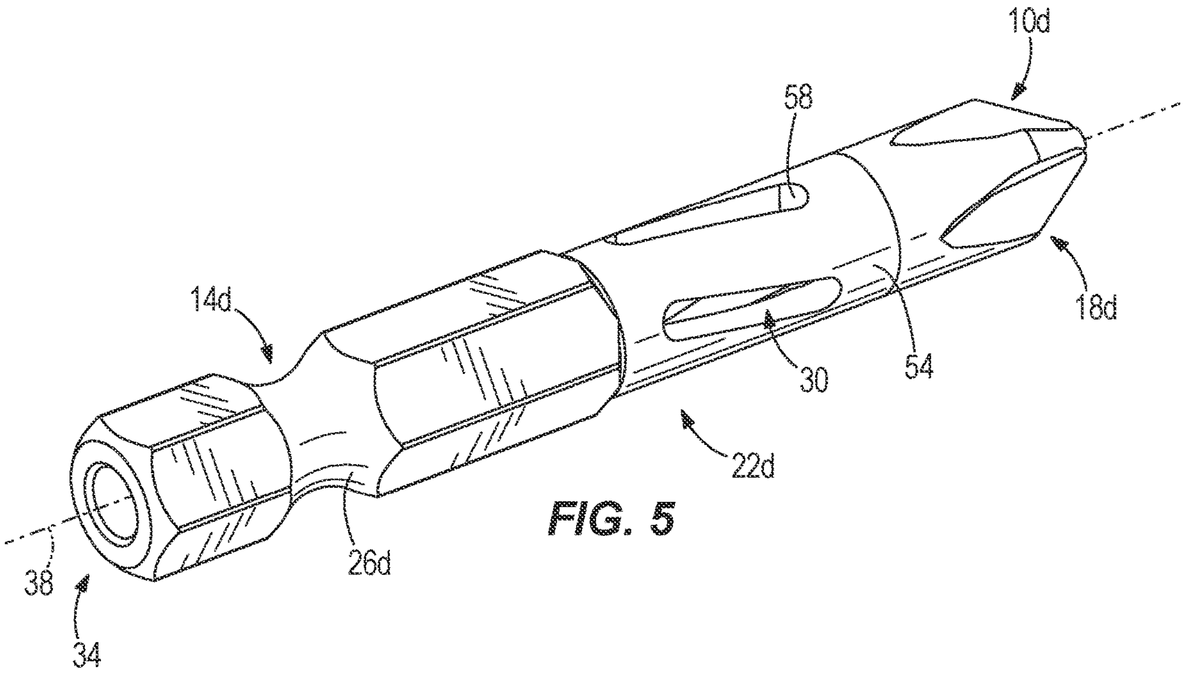
FIG. 5 is a perspective view of a tool bit in accordance with another embodiment of the invention.
Figure 8:
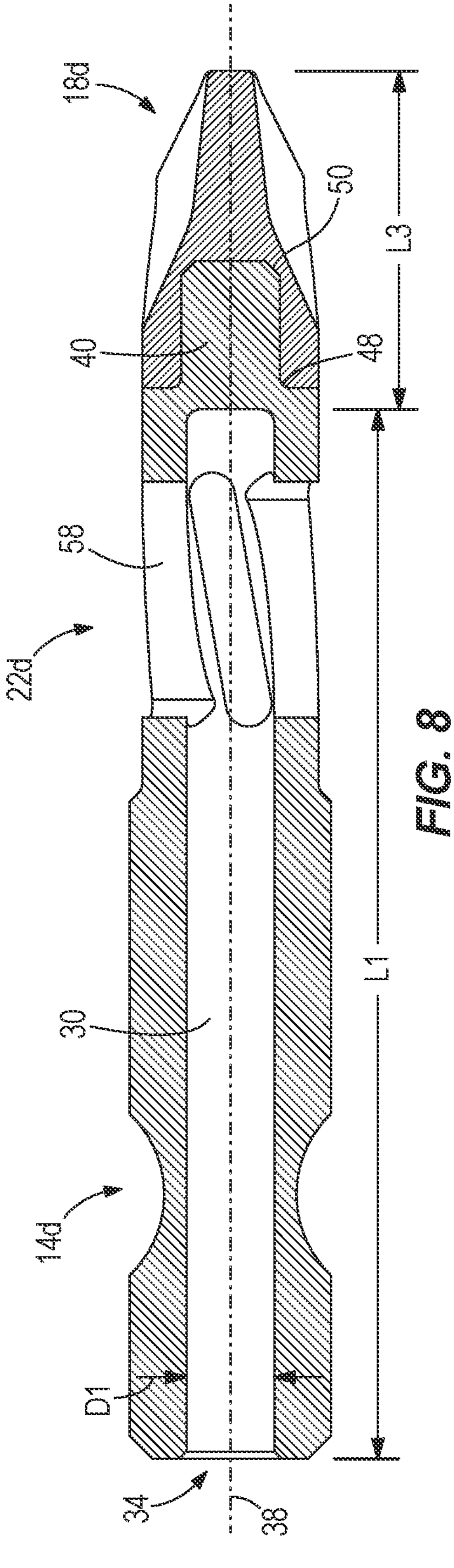
FIG. 8 is a cross-sectional view of the tool bit of FIG. 5 through section line 8-8 in FIG. 7.
Figure 9:
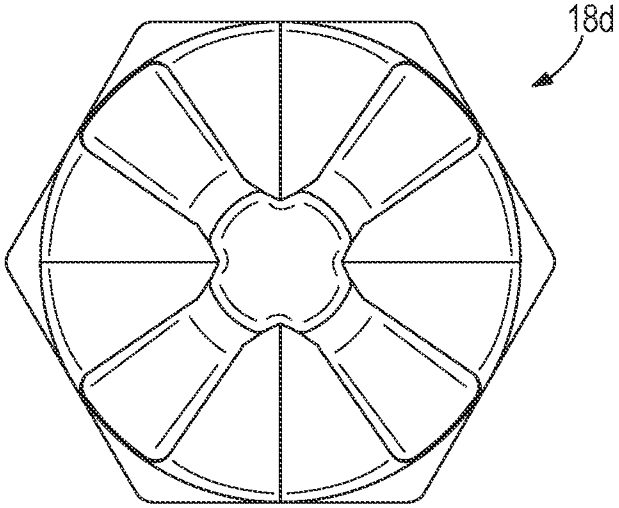
FIG. 9 is a front view of the tool bit of FIG. 5.

FIG. 5 illustrates a tool bit 10*d* in accordance with another embodiment of the invention, with like reference numerals with the letter "d" assigned to like features as the tool bit 10 shown in FIG. 1. The tool bit 10*d* includes a hollow core 30 that extends from a portion of the shank 22*d* adjacent the tip 18*d*, through the shank 22*d*, and towards the hexagonal drive portion 14*d* (FIG. 8). In the illustrated embodiment of the bit 10*d*, the hollow core 30 extends entirely through the hexagonal drive portion 14*d*, terminating in an opening 34 opposite from the tip 18*d* (FIGS. 5 and 8). Alternatively, the core 30 may terminate prior to reaching the distal end of the drive portion 14*d*. For example, the core 30 may extend entirely through the shank 22*d*, but only partially through the drive portion 14*d*. Or, the core 30 may terminate prior to reaching the drive portion 14*d*. As shown in FIG. 8, the hollow core 30 includes a substantially uniform diameter D1 along its length L1. The tool bit 10*d* includes a major longitudinal axis 38, which also defines a rotational axis of the tool bit 10*d*, that is collinear or coaxial with the hollow core 30. Alternatively, the hollow core 30 may terminate prior to reaching the end of the drive portion 14*d* opposite the tip 18*d*, so that the opening 34 is omitted. For example, in another embodiment of the tool bit, the hollow core 30 may coincide only with the shank 22*d*, with the length L1 of the hollow core 30 being substantially equal to that of the shank 22*d*.

For the two-inch bit 10*d* shown in FIG. 8, the length L1 of the hollow core 30 is about 1.45 inches to about 1.53 inches, with a nominal length L1 of about 1.49 inches. Furthermore, the diameter D1 of the hollow core 30 is about 0.100 inches to about 0.150 inches, with a nominal diameter D1 of about 0.125 inches. As a result, a ratio of the length L1 to the diameter D1 of the hollow core 30 is about 9.6:1 to about 15.3:1, with a nominal ratio of about 11.9:1. Alternatively, the ratio of the length L1 to the diameter D1 of the hollow core 30 may be greater than about 15.3:1 or less than about 9.1:1 to accommodate different size or length bits 10. In addition, the ratio of the total length of the two-inch bit 10*d* to the length L1 of the hollow core 30 is about 1.3:1 to about 1.4:1, with a nominal ratio of about 1.35:1. Alternatively, the ratio of the total length of the bit 10*d* to the length L1 of the hollow core 30 may be greater than about 1.4:1 or less than about 1.3:1 to accommodate different size or length bits 10.

Figure 6:
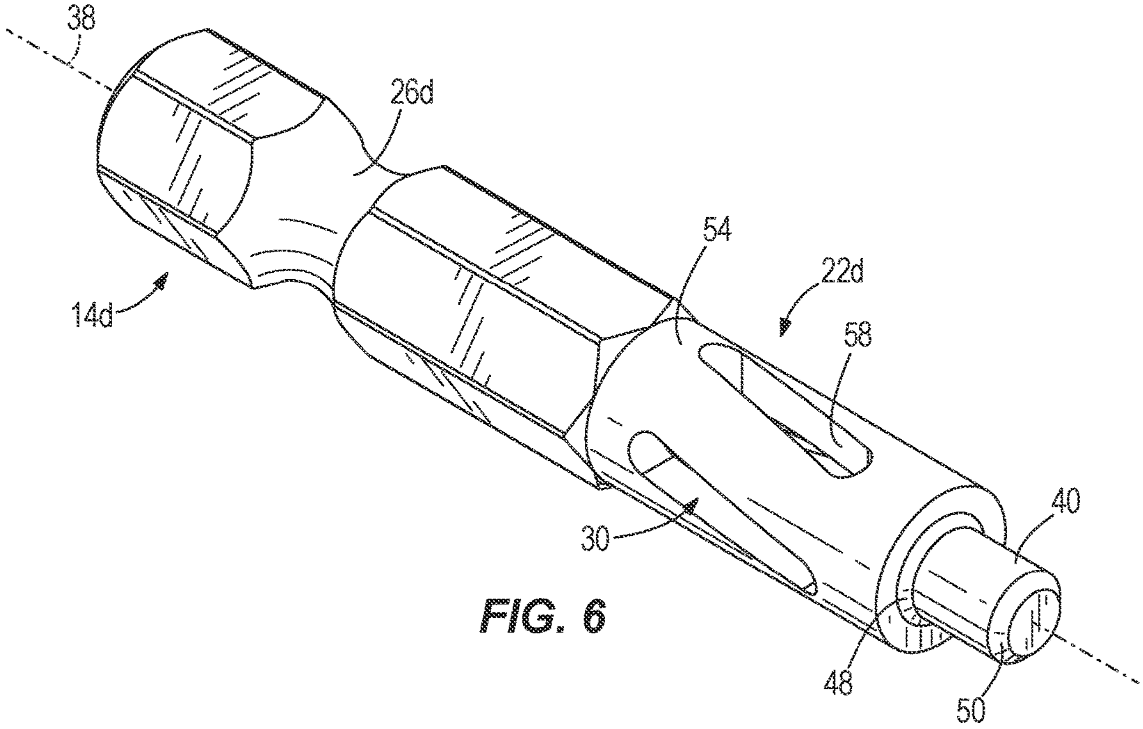
FIG. 6 is a perspective view of the tool bit of FIG. 5 with a working end of the bit removed.

With reference to FIG. 6, the tip 18*d* is omitted from the tool bit 10*d* exposing a protrusion 40 extending from the shank 22*d* and coaxial with the major longitudinal axis 38. As is described in greater detail below, the protrusion 40 facilitates manufacturing the tool bit 10*d* using the two-shot MIM process. The protrusion 40 defines a cylindrical shape having a fillet 48 and a chamfer 50 at opposite ends of the protrusion 40. Alternatively, the protrusion 40 may be differently configured as a cone, a semi-sphere, or the like. Further, the protrusion 40 may be configured with one or more radially extending keyways, splines, or teeth, or the protrusion 40 may be cylindrical yet offset from the longitudinal axis 38, to facilitate torque transfer between the shank 22*d* and the tip 18*d*. As a further alternative, the protrusion 40 may be formed on the tip 18*d*, and the shank 22*d* may be molded around the protrusion 40 thereby positioning the protrusion 40 within the core 30.

Figure 7:
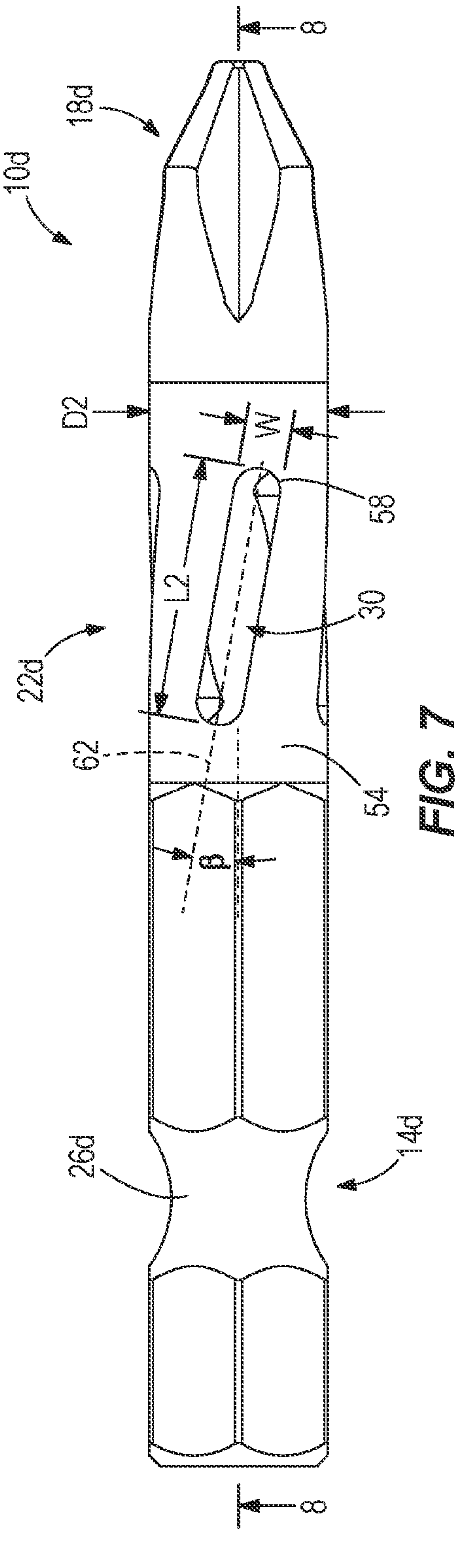
FIG. 7 is a side view of the tool bit of FIG. 5.

With reference to FIGS. 5-7, the shank 22*d* is defined by a peripheral surface 54 that extends between the working end 18*d* and the hexagonal drive portion 14*d*. The peripheral surface 54 defines a uniform diameter D2 of the shank 22*d* (FIG. 7). Alternatively, the shank 22*d* may be differently configured. For example, in another embodiment of the tool bit, the shank 22*d* may be configured to include a non-uniform diameter with a concave shape similar to the tool bits 10, 10*a*, and 10*b*.

The shank 22*d* includes slots 58 spaced about the peripheral surface 54 at 90 degree angular increments, with each of the slots 58 defining a minor longitudinal axis 62 (FIG. 7). The slots 58 extend radially with respect to the major longitudinal axis 38 between the hollow core 30 and the peripheral surface 54. Therefore, the slots 58 communicate the hollow core 30 with the ambient surroundings of the tool bit 10. Alternatively, the tool bit 10*d* may be configured with more or fewer than four slots 58, and the slots 58 may be located or dispersed about the shank 22*d* at different angular increments other than 90 degrees. For example, in an alternative embodiment of the tool bit 10*d*, the slots 58 may be omitted entirely and the presence of the hollow core 30 through the shank 22*d* is sufficient to provide the desired amount impact resistance to the bit 10*d*. For the two-inch bit 10*d* shown in FIG. 7, each of the slots 58 includes a length L2 of about 0.250 inches to about 0.350 inches, with a nominal length L2 of about 0.300 inches. Furthermore, the slots 58 include a width W of about 0.030 inches to about 0.100 inches, with a nominal width of about 0.065 inches. As a result, a ratio of the length L2 to the width W of the slots 58 is about 2.5:1 to about 11.7:1, with a nominal ratio of about 4.6:1. Alternatively, the ratio of the length L2 to the width W of the slots 58 may be greater than about 11.7:1 or less than about 2.5:1 to accommodate different size or length tool bits 10*d*. Regardless of the total length of the bit 10*d*, a length dimension L3 (FIG. 8) extending between a front end of the core 30 and the distal end of the tip 18*d* is about 0.38 inches to about 0.58 inches, with a nominal value of 0.48 inches.

Figure 10:
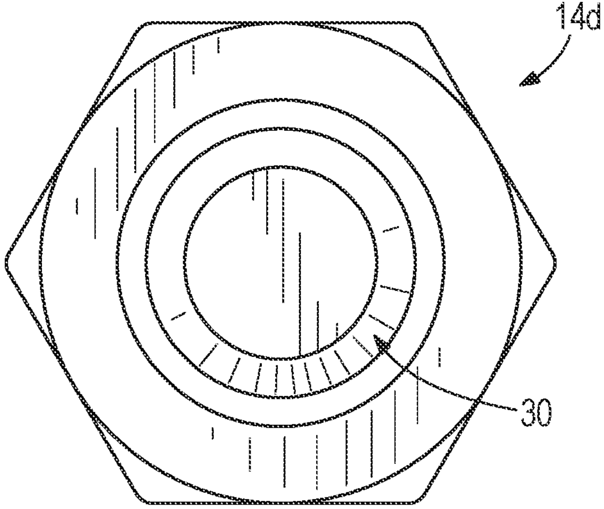
FIG. 10 is a rear view of the tool bit of FIG. 5.

With continued reference to FIG. 7, the slots 58 are oriented at an oblique angle β between the major longitudinal axis 38 and the minor longitudinal axis 62. The oblique angle β is about 0 degrees to about 20 degrees, with a nominal value of about 10 degrees. Alternatively, the oblique angle β may be greater than about 20 degrees to accommodate different size or length tool bits 10. In some embodiments, the oblique angle β may be zero degrees, thereby orienting the slots 58 parallel with the longitudinal axis 38. However, orienting the slots 58 with a positive value for angle β as shown in FIG. 7 causes the shank 22*d* to elongate as it twists (i.e., assuming application of torque to the drive portion 14*d* in a clockwise direction from the frame of reference of FIG. 10), thereby displacing the tip 18*d* toward the fastener as it is driven into a workpiece. Accordingly, the contact surface between the fastener head and the tip 18*d* may be increased simultaneously as the reaction torque applied by the fastener to the bit 10*d* is increased, reducing the likelihood that the tip 18*d* slips on the fastener head.

The hollow core 30 and the slots 58 in the tool bit 10*d* work in conjunction to increase the impact resistance or the toughness of the tool bit 10*d*, such that the tip 18*d* of the tool bit 10*d* is allowed to elastically deform or twist relative to the hexagonal drive portion 14*d* about the major longitudinal axis 38 of the tool bit 10*d*. Specifically, the polar moment of inertia of the shank 22*d* is decreased by incorporating the hollow core 30 and slots 58, thereby reducing the amount of torsion required to elastically twist the shank 22*d*, compared to a configuration of the shank having a solid cylindrical shape without the slots 58 (e.g., shanks 22, 22*a*, 22*b*).

In the illustrated embodiment of the tool bit 10*d*, the tip 18*d* made of a first material having a first hardness and the shank 22*d* is made of a second material having a second, different hardness. Particularly, the hardness of the tip 18*d* is greater than the hardness of the shank 22*d* to reduce the wear imparted to the tip 18*d* during use of the bit 10*d*. The reduced hardness of the shank 22*d* relative to the tip 18*d*, however, also increases the impact-resistance of the bit 10*d*. For example, the first hardness is about 55 HRC to about 65 HRC, with a nominal hardness of about 62 HRC, while the second hardness is about 40 HRC to about 55 HRC, with a nominal hardness of about 45 HRC. Therefore, a ratio between the first hardness and the second hardness is about 1:1 to about 1.7:1, with a nominal ratio of about 1.4:1. Alternatively, the ratio between the first hardness and the second hardness may be greater than about 1.7:1 to provide optimum performance of the tool bit 10*d*. The first and second materials are each comprised of a ferrous alloy composition, though different materials may alternatively be used.

As mentioned above, the two-shot metal MIM process is used to manufacture the bit 10*d* to make the conjoined tip 18*d* and shank 22*d* from two different materials. In other embodiments, the two-shot MIM process may be used to manufacture tool bits 10, 10*a*, 10*b*, and 10*c*. Particularly, in the illustrated embodiment of the tool bit 10*d*, the tip 18*d* is made from a material having a greater hardness than that of the shank 22*d* and the hexagonal drive portion 14*d*. Because the dissimilar materials of the tip 18*d* and the shank 22*d*, respectively, are conjoined or integrally formed during the two-shot MIM process, a secondary manufacturing process for connecting the tip 18*d* to the remainder of the bit 10*d* is unnecessary. Furthermore, the protrusion 40 provides a greater surface area between the tip 18*d* and the shank 22*d* so that the bond between dissimilar metals of the tip 18*d* and the shank 22*d* is stronger compared, for example, to using a flat mating surface between the tip 18*d* and the shank 22*d*. In addition, the protrusion 40 increases the shear strength of the bit 10*d* at the intersection of the tip 18*d* and the shank 22*d*.

Figure 11:
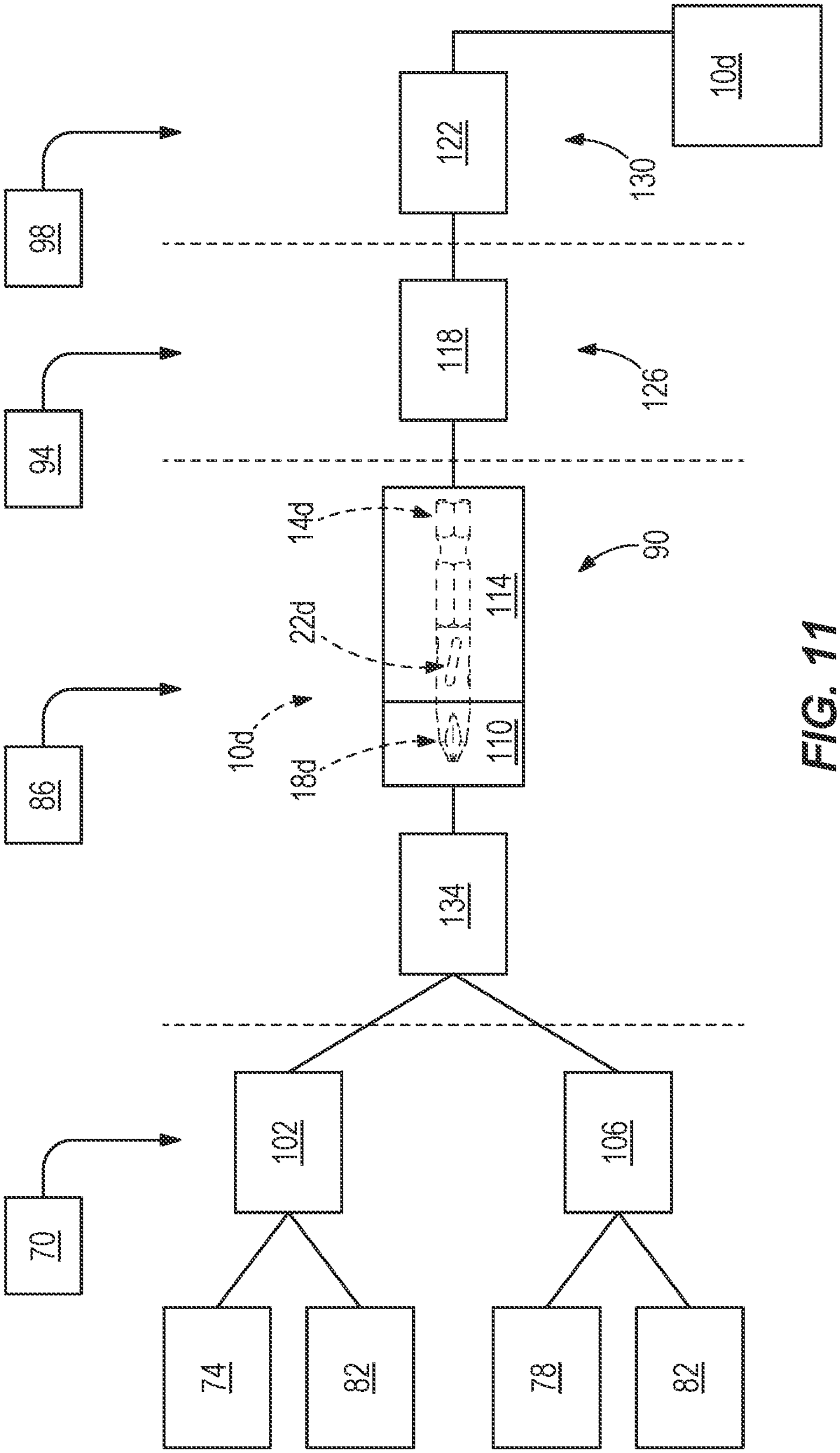
FIG. 11 is a schematic of a process for manufacturing the tool bit of FIG. 5.

With reference to FIG. 11, the two-shot MIM process includes in sequence a feedstock mixing process 70 to mix the first and the second materials 74, 78 with a binder composition 82, an injection molding process 86 using a mold 90, a debinding process 94 to eliminate the binder composition 82, and a heat treating process 98.

During the feedstock mixing process 70, the binder composition 82 is added to the first and the second materials 74, 78 to facilitate processing through the injection molding process 86. As a result, the first material 74, which is in a powder form, is homogeneously mixed with the binder composition 82 to provide a first feedstock mixture 102 of a determined consistency. In addition, the second material 78, which is also in a powder form, is also homogeneously mixed with the binder composition 82 to provide a second feedstock mixture 106 with substantially the same consistency as the first mixture 102. In the illustrated embodiment of the tool bit 10*d*, the binder composition 82 includes a thermoplastic binder. Alternatively, the binder composition 82 may include other appropriate binder compositions (e.g., wax). The amount of binder composition 82 in each of the first and second feedstock mixtures 102, 106 is chosen to match the shrink rates of the tip 18*d* and the drive portion 14*d*/shank 22*d*, respectively, during the sintering process 122 described below.

The injection molding process 86 includes processing the first and the second feedstock mixtures 102, 106 through an injection molding machine 134. Particularly, the process 86 includes injecting the first feedstock mixtures 102 into a first portion 110 of the mold 90, and injecting the second feedstock mixture 106 into a second portion 114 of the mold 90. In the illustrated embodiment shown in FIG. 11, the tip 18*d* of the tool bit 10*d* is generally formed in the first portion 110 of the mold 90, while the shank 22*d* and the drive portion 14*d* of the tool bit 10*d* are generally formed in the second portion 114 of the mold 90. Upon completion of the injection molding process 86, a temporary (otherwise known in the MIM industry as a "green") tool bit 126 is produced that includes the first and the second materials 74, 78 and the binder composition 82. The "green" tool bit 126 is larger than the final tool bit 10*d* due to the presence of the binder composition 82.

The injection molding process 86 may be carried out in various ways to form the "green" tool bit 126. For example, the "green" tool bit 126 can be initially formed along the major longitudinal axis 38 from the hexagonal drive portion 14*d* to the tip 18, or from the tip 18*d* to the hexagonal drive portion 14*d*. Alternatively, the "green" tool bit 126 can be initially formed from a side-to-side profile as oriented in FIG. 7.

After the injection molding process 86, the "green" tool bit 126 is removed from the mold 90 and proceeds through the debinding process 94. The debinding process 94 eliminates the binder composition 82. During the debinding process 94, the "green" tool bit 126 transforms into a "brown" tool bit 130 (as it is known in the MIM industry) that only includes the first and the second materials 74, 78. In the illustrated embodiment, the debinding process 94 includes a chemical wash 118. Alternatively, the debinding process 94 may include a thermal vaporization process to remove the binder composition 82 from the "green" tool bit 126. The "brown" tool bit 130 is fragile and porous with the absence of the binder composition 82.

To reduce the porosity of the "brown" tool bit 130, the heat treating process 98 is performed to atomically diffuse the "brown" tool bit 130 to form the final tool bit 10*d*. The heat treating process 98 exposes the "brown" tool bit 130 to an elevated temperature to promote atomic diffusion between the first and the second materials 74, 78, allowing atoms of the dissimilar materials 74, 78 to interact and fuse together. The heat treating process 98 reduces the porosity of the "brown" tool bit 130 to about 95% to about 99% to yield the final tool bit 10*d*. In the illustrated embodiment, the heat treating process 98 includes a sintering process 122. Alternatively, the debinding process 94 and the heat treating process 98 may be combined as a single process such that, at lower temperatures, thermal vaporization will occur during the debinding process 94 to eliminate the binder composition 82. And, at higher temperatures, atomic diffusion will reduce the porosity in the "brown" tool bit 130 to yield the final tool bit 10*d*.

Various features of the invention are set forth in the following claims.

What is claimed is:

1. A tool bit comprising:

a hexagonal drive portion;

a working end made of a first material having a first hardness; and a shank interconnecting the drive portion and the working end, the shank defining a longitudinal axis about which the tool bit is rotatable and being made of a second material having a second, different hardness, the shank including a protrusion extending within a portion of the working end and having a distal end, and an annular shoulder surrounding the protrusion, the annular shoulder defining a rearmost stop against which a terminal end of the working end is abutted, wherein the working end does not extend beyond the annular shoulder, and wherein at least one of the distal end or the shoulder is oriented perpendicular to the longitudinal axis.

2. The tool bit of claim 1, wherein the shank further comprises a hollow core.

3. The tool bit of claim 2, wherein the shank includes a plurality of radially extending slots in communication with the hollow core.

4. The tool bit of claim 1, wherein both the distal end of the protrusion and the shoulder are oriented perpendicular to the longitudinal axis.

5. The tool bit of claim 1, wherein the protrusion is coaxial with the longitudinal axis.

6. The tool bit of claim 1, wherein the protrusion defines a cylindrical shape, and wherein the shank includes a fillet between the shoulder and the protrusion.

7. The tool bit of claim 6, wherein the protrusion has a chamfer adjacent the distal end.

8. A tool bit comprising:

a hexagonal drive portion;

a working end made of a first material having a first hardness; and a shank interconnecting the drive portion and the working end, the shank defining a longitudinal axis about which the tool bit is rotatable and being made of a second material having a second, different hardness;

wherein the working end includes a blind bore in which a portion of the shank is receivable and an annular working end shoulder surrounding an opening of the blind bore, the annular working end shoulder is abutted against an annular shoulder surrounding the protrusion, wherein the working end shoulder is oriented perpendicular to the longitudinal axis, wherein the working end does not extend beyond the annular shoulder, and wherein an interior surface of the blind bore is oriented perpendicular to the longitudinal axis.

9. The tool bit of claim 8, wherein the shank includes a protrusion extending within the blind bore of the working end and having a distal end, and an annular shank shoulder surrounding the protrusion, wherein at least one of the distal end or the shank shoulder is oriented perpendicular to the longitudinal axis, and wherein the shank shoulder interfaces with the working end shoulder.

10. The tool bit of claim 9, wherein both the distal end of the protrusion and the shank shoulder are oriented perpendicular to the longitudinal axis.

11. The tool bit of claim 8, wherein the shank further comprises a hollow core.

12. The tool bit of claim 11, wherein the shank includes a plurality of radially extending slots in communication with the hollow core.

13. A tool bit comprising:

a hexagonal drive portion;

a working end made of a first material having a first hardness; and a shank interconnecting the drive portion and the working end, the shank defining a longitudinal axis about which the tool bit is rotatable and being made of a second material having a second, different hardness, wherein the shank includes a distal end oriented perpendicular to the longitudinal axis, an annular shoulder at a perimeter of the shank, and a cylindrical portion between the shoulder and the distal end, wherein the working end includes a blind bore receiving the distal end and abutting against the shoulder, and wherein the working end does not extend beyond the annular shoulder.

14. The tool bit of claim 13, wherein the first hardness is higher than the second hardness.

15. The tool bit of claim 13, wherein the shank includes a protrusion extending within a portion of the working end, the protrusion including the cylindrical portion and defining the distal end of the shank, wherein the shoulder surrounds the protrusion, and wherein the shoulder is oriented perpendicular to the longitudinal axis.

16. The tool bit of claim 15, wherein the shank includes a hollow core, and wherein the hollow core and the protrusion are coaxially aligned with the longitudinal axis.

17. The tool bit of claim 15, wherein the shank includes a fillet between the shoulder and the protrusion.

18. The tool bit of claim 17, wherein the protrusion has a chamfer between the distal end and the cylindrical portion.

19. The tool bit of claim 13, wherein the first material and the second material include a ferrous alloy composition.

* * * * *